(12) United States Patent
Wolf et al.

(10) Patent No.: US 6,238,456 B1
(45) Date of Patent: May 29, 2001

(54) TANTALUM POWDER, METHOD FOR PRODUCING SAME POWDER AND SINTERED ANODES OBTAINED FROM IT

(75) Inventors: Rüdiger Wolf, Vienenburg; Karlheinz Reichert, Wolfenbüttel; Heike Biermann, Salzgitter; Josua Löffelholz, Langelsheim; Detlef Breithaupt, Salzgitter, all of (DE)

(73) Assignee: H. C. Starck GmbH & Co. KG, Goslar (DE)

( * ) Notice: Subject to any disclaimer, the term of this patent is extended or adjusted under 35 U.S.C. 154(b) by 0 days.

(21) Appl. No.: 09/367,903

(22) PCT Filed: Feb. 9, 1998

(86) PCT No.: PCT/EP98/00699

§ 371 Date: Aug. 19, 1999

§ 102(e) Date: Aug. 19, 1999

(87) PCT Pub. No.: WO98/37249

PCT Pub. Date: Aug. 27, 1998

(30) Foreign Application Priority Data

Feb. 19, 1997 (DE) .................................................. 197 06 414
Feb. 19, 1997 (DE) .................................................. 197 06 415

(51) Int. Cl.[7] .................................. B22F 3/12; C22C 1/06
(52) U.S. Cl. .................................. 75/245; 75/255; 75/622; 419/34; 419/38
(58) Field of Search ........................... 75/245, 255, 622; 419/34, 38

(56) References Cited

U.S. PATENT DOCUMENTS

| | | | |
|---|---|---|---|
| 3,427,132 | 2/1969 | Goon | 23/204 |
| 3,825,802 | 7/1974 | Kumagai et al. | 317/230 |
| 3,984,208 | 10/1976 | Moulin et al. | 29/182 |
| 4,154,609 | 5/1979 | Hahn | 75/252 |
| 4,483,819 | 11/1984 | Albrecht et al. | 419/2 |
| 4,512,805 | 4/1985 | Albrecht et al. | 75/244 |
| 4,544,403 | 10/1985 | Schiele et al. | 75/0.5 AB |
| 4,645,533 | 2/1987 | Izumi | 75/0.5 BB |
| 4,740,238 | 4/1988 | Schiele | 75/0.5 BB |
| 4,940,490 | 7/1990 | Fife et al. | 75/229 |
| 4,954,169 | 9/1990 | Behrens | 75/228 |
| 5,211,741 | 5/1993 | Fife | 75/255 |
| 5,261,942 | 11/1993 | Fife et al. | 75/342 |
| 5,442,978 | 8/1995 | Hildreth et al. | 75/363 |
| 5,448,447 | 9/1995 | Chang | 361/529 |
| 5,560,761 | 10/1996 | Naito | 75/255 |
| 5,580,367 | 12/1996 | Fife | 75/255 |
| 5,605,561 | 2/1997 | Iwabuchi et al. | 75/364 |
| 5,986,877 | * 11/1999 | Pathare et al. | 361/508 |

FOREIGN PATENT DOCUMENTS

| | | |
|---|---|---|
| 197 06 414 | 10/1997 | (DE) . |
| 0665302 | 8/1995 | (EP) . |
| 63-86509 | 9/1986 | (JP) . |

* cited by examiner

*Primary Examiner*—Daniel Jenkins
(74) *Attorney, Agent, or Firm*—Joseph C. Gil; Diderico van Eyl

(57) ABSTRACT

The present invention discloses a tantalum powder for capacitors and a method for making said tantalum powder wherein agglomerated tantalum powder is produced by means of thermal agglomeration of starting tantalum powders in the presence of hydrogen.

11 Claims, No Drawings

TANTALUM POWDER, METHOD FOR PRODUCING SAME POWDER AND SINTERED ANODES OBTAINED FROM IT

The present invention relates to a tantalum powder, to pressed and sintered anodes obtainable from the tantalum powder and to a process for the production of tantalum powders.

BACKGROUND OF THE INVENTION

Metallic tantalum powder is conventionally produced by reducing $K_2TaF_7$ with sodium. The physical properties of tantalum powders, such as for example grain size or specific surface area, are controlled by the addition of inert salts, such as KCl, NaCl, KF, NaF. As the inert salt content increases, the finer is the resultant tantalum powder, i.e. the resultant metal surface area is enlarged. However, the throughput of tantalum metal in the reduction process decreases in accordance with the increasing inert salt concentration.

Once the salts have been leached out, the tantalum powder is dried and subjected to high temperature treatment under a vacuum or in an inert gas atmosphere in order to purify it further. During this agglomeration stage, the specific surface area is significantly reduced and the oxygen content of the powder distinctly increased. This oxygen content is lowered again by heat treatment with metals having a reducing action, in particular magnesium. This reducing agglomeration results in a further slight reduction in surface area. In order to optimise the electrical properties of the capacitors produced from these tantalum powders, the tantalum powders are combined with dopants containing phosphorus and/or boron.

The electrical properties of tantalum powders, such as the specific capacitance or residual current are tested on a pressed, sintered and then anodically oxidised, i.e. formed, anode. The specific capacitance, stated in $\mu FV/g$, is a measure of the capacity of the capacitor and is directly proportional to the surface area of the metal. Residual current, stated in $nA/\mu FV$, is an indicator of how well a capacitor holds its charge.

Capacitor powders having specific capacitance values of 18000 to 70000 $\mu FV/g$ are produced economically using the conventional industrial sodium reduction of $K_2TaF_7$ in fused salt. In order to obtain the tantalum powders having a small primary particle size which are required for high capacity capacitors, it is necessary to perform sodium reduction of $K_2TaF_7$ at a relatively high dilution (diluent salts KCl, KF, NaCl), which results in smaller agglomerates (secondary particle size 1 to 5 $\mu m$ at primary particle sizes of approx. 0.3 $\mu m$). The small dimensions of the agglomerates make it necessary to perform thermal agglomeration of the tantalum powders (presintering), wherein, on the one hand, unwanted impurities are removed but, on the other, the specific surface area is further reduced. The most highly capacitive tantalum capacitor powders hitherto known are described in DE 195 36 013 A1. Specific capacitance values of up to 91810 $\mu FV/g$ are achieved in sintered anodes produced therefrom if the otherwise conventional thermal agglomeration stage is omitted. These tantalum powders contain disruptive impurities, such as for example fluoride, in concentrations of >100 ppm. A proportion of the elevated fluoride content is eliminated during sintering of the anodes. The fluorides released in this manner cause thermal corrosion in the sintering furnaces. A tantalum powder produced according to Example 6 of DE 195 36 013 A1 thus has a fluoride content of 460 ppm and an Mg content of 200 ppm. A further disadvantage is the elevated residual current values of the sintered anodes produced therefrom.

As is known, residual current values may be improved by doping with nitrogen or combinations of nitrogen with other elements such as carbon or sulfur in medium and low capacitive powders having specific capacitance values of <30000 $\mu FV/g$. This is described in U.S. Pat. No. 3,427,132, U.S. Pat. No. 3,825,802, U.S. Pat. No. 3,984,208, U.S. Pat. No. 4,154,609 and U.S. Pat. No. 4,544,403.

In these documents, nitrogen doping is used to reduce the oxygen content of the powders, to increase reliability or to improve residual current.

U.S. Pat. No. 187,598 furthermore describes a process which, after deoxidation, results in surface nitridation at temperatures of below 500° C. with nitrogen contents of <1000 ppm and an improvement in residual current of up to 30%. This method is, however, unsuitable for doping higher nitrogen contents, as the Ta powder undergoes an uncontrolled conversion into tantalum nitride at a temperature of above 500° C.

U.S. Pat. No. 5,448,447 describes a process in which nitridation is performed by nitrogen gas or magnesium nitride, but which also permits doping of higher contents. This nitriding process has the disadvantage that an air-sensitive substance with varying nitrogen contents must be used, which means that a certain nitrogen level may reproducibly and accurately be established only with difficulty. JP-A 231 644 discloses nitridation with ammonia at temperatures of 1100° C.

However, all these processes are restricted to powders having capacitance values of at most 30000 $\mu FV/g$ and applications for elevated working voltages of >16 V (forming voltage >70 V). Nitrided powders having capacitance values of >30000 $\mu FV/g$ have not hitherto been known.

One reason for this is that the stated processes exhibit the disadvantage that, in fine Ta powders having a relatively high surface activity (BET>1.5, capacitance values >30000 $\mu FV/g$), nitrogen contents of greater than 500 ppm cannot homogeneously be incorporated, due to the poorly controllable exothermic reaction of nitrogen or gases containing nitrogen such as ammonia. As described in U.S. Pat. No. 187,598, the reaction proceeds to completion in an uncontrolled manner. Moreover, all these processes exhibit the disadvantage that an additional processing stage is necessary for the nitridation.

Very finely divided powders are obtained by the gas phase reduction of $TaCl_5$ with hydrogen. This gives rise to substantially discrete powders which no longer flow freely. Due to the difficulty of processing such powders under industrial conditions, they have found no acceptance in capacitor technology.

SUMMARY OF THE INVENTION

The object of the invention is to provide a tantalum powder which does not exhibit the stated disadvantages. A further object of the present invention is to provide an economic process for the production of ultra-capacitive tantalum powders.

The present invention here follows the approach already disclosed in DE-A 31 30 392 of agglomeration under mild reducing conditions, in accordance with which both a decrease in oxygen contents and agglomeration (presintering) without substantial coarsening of the primary grains may be achieved by a mild heat treatment in conjunction with reducing metals.

It has now been found that by using hydrogen as a chemically active agent before or during the reducing agglomeration, agglomerates (sintered aggregates) may be produced even at low temperatures which are sufficiently stable and contain no critical impurities, such as for example fluorine and are thus suitable for capacitor production.

The present invention accordingly provides a process for the production of pure agglomerated tantalum powder for capacitors by means of thermal agglomeration of starting tantalum powders, which process is characterised in that thermal agglomeration is performed in the presence of hydrogen at temperatures of 600 to 1000° C., preferably of below 950° C.

DESCRIPTION OF THE PREFERRED EMBODIMENTS

The tantalum powder used is preferably a powder produced by reduction with metallic sodium from potassium heptafluorotantalate in an alkali metal halide melt and subsequent leaching of the salt. Production preferably proceeds in accordance with U.S. Pat. No. 5,442,978 by incremental addition of sodium to the salt melt which contains tantalum pentafluoride and is maintained at approx. 1000° C. The resultant tantalum powder consists of very finely divided primary grains of a diameter of 100 to 400 nm (determined by visual evaluation of SEM micrographs), which are sintered into agglomerates of a diameter of 1 to 5 $\mu$m. The specific surface area determined by the BET method (Quantasorb, 3 point) is 1.4 to 3.5 m$^2$/g. A particle size value of 0.3 to 0.4 $\mu$m FSSS (according to a Fisher Sub-Sieve Sizer) is furthermore frequently stated to provide a provisional characterisation.

This tantalum powder still contains fluorine in quantities of above 500 ppm to approx. 1000 ppm.

The crude tantalum powder is now subjected according to the invention to chemically activated agglomeration under the action of hydrogen. This brings about partial sintering of the powder with a simultaneous decrease in the content of impurities, in particular of fluorine.

According to the invention, the hydrogen may be provided in the form of an inert gas atmosphere containing hydrogen, preferably a pure hydrogen atmosphere. It is furthermore preferred according to the invention to provide the hydrogen in the form of oxygen-free compounds which release hydrogen under the conditions of thermal agglomeration. Preferred hydrogen-releasing compounds are ammonium salts, in particular ammonium chloride, and alkaline earth metal hydrides, such as calcium hydride and magnesium hydride.

Ammonium salts are particularly preferred, in particular ammonium chloride, as they achieve two favourable effects simultaneously, namely firstly provision of the hydrogen which activates sintering and secondly provision of the dopant nitrogen, which improves residual current, which dopant diffuses into the tantalum metal and remains therein.

When hydrogen-releasing compounds are used, the temperature during thermal treatment may advantageously be below 900° C., particularly preferably in the range between 750 and 850° C., whereas when gaseous hydrogen is used, a higher temperature range of between 900 and 950° C. is preferred.

The chemically activated agglomeration is advantageously performed in the simultaneous presence of metal chips, in particular magnesium chips, having a reducing action.

After the thermal treatment, the highly reactive powders are passivated by gradual admission of air.

Before and/or after chemically activated agglomeration, one or more phosphorus doping treatments are advantageously performed in a known manner. To this end, the powder is combined with a phosphate solution and dried. Further heat treatment may proceed in a manner known per se under reducing conditions in the presence of magnesium chips, such that oxygen is prevented from diffusing into the powder particles during this heat treatment. According to the invention, the reducing heat treatment is performed at temperatures of no more than 870° C., preferably of no more than 850° C.

In a preferred embodiment, the crude tantalum primary powder is subjected to wet compaction before the chemically activated agglomeration. This is advantageously performed by adjusting the primary powder, which is still moist after washing, in a dish to a water content such that the powder/water mixture is converted into a thixotropic composition by vibration. Alternatively, an already dried primary powder may be worked to a paste with water and converted into the thixotropic state by vibration. The water content of the powder/water mixture required for this purpose is generally approx. 25 wt. %. The material is dried and the resultant compact lumps of compacted primary powder are ground and subjected to chemically active agglomeration either in their present compact form or in only coarsely comminuted form or also with the final grain size of the tantalum capacitor powder to be produced (for example <400 $\mu$m). The remaining process stages, such as doping and reductive agglomeration at low temperature remain unchanged in comparison with the embodiment described above. This improved embodiment primarily results in an increase in bulk density and an improvement in flowability. Wet compaction may also proceed by means of an aqueous solution of ammonium phosphate, if it is intended to provide initial doping with phosphorus, or an ammonium chloride solution to provide nitrogen doping.

The tantalum powders obtained according to the invention have outstandingly good properties both with regard to the processing thereof to produce capacitors and with regard to the achievable electrical properties of the capacitors producible therefrom.

The flowability of the powder is typically between 0.3 and 1 g/sec, measured by passage through a vibrating hopper having an angle of divergence of 60° and a 3.9 mm diameter outlet.

Fluorine content is below 200 ppm, preferably below 60 ppm, such that equipment corrosion during sintering of capacitor anodes is kept within limits and a negative influence on electrical properties is avoided.

With regard to their electrical properties, the powders according to the invention are characterised in that, after pressing at a compaction density of 5 g/cm$^3$, sintered anodes are obtainable therefrom by sintering at 1200° C. for 10 minutes and forming at a voltage of 16 volts which have specific capacitance of 80000 to 120000 $\mu$FV/g, preferably of above 90000, in particular preferably of above 100000 $\mu$FV/g, at a residual current of less than 5 nA/$\mu$FV, preferably of less than 3 nA/$\mu$FV, more preferably of less than 1.5 nA/$\mu$FV, very particular preferably of less than 1 nA/$\mu$FV. Such powders are for the first time made available by the invention.

According to provisional results, it would appear that the lowest residual current values of below 1 nA/$\mu$FV are achieved if, accepting fluorine contents of up to 200 ppm, chemically activated agglomeration is performed with hydrogen-releasing nitrogen compounds and nitrogen doping proceeds such that the powders have nitrogen contents of 2000 to 12000 ppm.

With regard to their structure, the tantalum powders according to the invention are characterised in that they have low fluorine and alkali metal contents, have a particle size determined by FSSS of 0.35 to 1 μm, preferably of 0.4 to 0.65 μm, at a BET specific surface area of 1.4 to 3 m$^2$/g.

According to a different characterisation, the tantalum powders having low fluorine and alkali metal contents according to the invention have a primary particle size determined by visual evaluation of SEM micrographs of 100 to 400 nm, which are sintered together to form secondary particles having an average size of above 5 μm, determined as a Mastersizer D50 value (ASTM-B-288). The secondary particle sizes (D50) of the sintered primary particles are preferably above 7 μm, particularly preferably between 8 and 13 μm.

Before particle size was determined using the Mastersizer, the powders were subjected to a deagglomerating ultrasonication for 5 minutes in order to separate relatively large, inadequately sintered agglomerates.

The Mastersizer D50 values measured without deagglomerating ultrasonication are typically between 40 and 180 μm or between 40 and 100 μm, depending upon whether the powder was passed through a screen having a 400μ or 220μ mesh.

The tantalum powders according to the invention preferably have phosphorus contents of 50 to 1500 ppm, particularly preferably of up to 300 ppm, very particularly preferably of 100 to 200 ppm.

Further preferred tantalum powders have nitrogen contents of 300 to 15000 ppm, particularly preferably of 1000 to 12000 ppm.

The oxygen content of the powders according to the invention is in the range from 3000 μg/m$^2$ of surface, i.e. between 3000 and 10000 ppm, preferably from 4000 to 6000 ppm.

Alkali metal contents are below 50 ppm, alkaline earth metal contents below 200 ppm, preferably below 100 ppm, carbon below 100 ppm.

EXAMPLES

Example 1

A tantalum primary powder was produced starting from a mixture of 25 kg of K$_2$TaF$_7$, 75 kg of KCl, 75 kg of KF, 1 kg of a very fine tantalum powder and 140 g of Na$_2$SO$_4$ in an Inconel retort by incremental addition of sodium at a temperature of approx. 900° C., as described in U.S. Pat. No. 5,442,978. The tantalum primary powder was isolated from the cooled and comminuted reaction mixture by washing with weakly acidified water, wherein a concluding purification treatment was performed with a washing solution containing hydrofluoric acid and hydrogen peroxide. The tantalum primary powder obtained in this manner exhibited the following characteristics:

| | |
|---|---|
| Average grain size by Fisher Sub-Sieve Sizer (FSSS) | 0.35 μm |
| BET specific surface area (Quantasorb 3-point) | 2.42 m$^2$/g |
| Oxygen | 7230 ppm |
| Fluorine | 720 ppm |

1$^{st}$ Stage: Chemically Activated Agglomeration 180 g of the tantalum primary powder were placed in a steel combustion boat lined with tantalum sheet. The depth of the tantalum powder was 25 mm. The combustion boat was inserted into a tube of temperature-resistant steel, which was then purged with argon such that the atmosphere in the tube and in the pores of the powder contained no air and consisted solely of the inert gas. The tube with the filled combustion boat was then placed, with the stream of argon still being passed, into a preheated tubular furnace and heated to 950° C. Hydrogen was then passed through the tube over the powder instead of the argon. The flow velocity of the hydrogen was approx. 1 cm/sec, relative to the empty and cold tube. After 1 hour, argon was again passed over the material instead of hydrogen and the temperature reduced. Small inlet orifices in the ends of the tube were then opened such that air gradually penetrated over a period of approx. 18 hours and the material was passivated.

The most important data relating to the defluoridated tantalum primary powder are:

| | |
|---|---|
| Average grain size by Fisher Sub-Sieve Sizer (FSSS) | 0.44 μm |
| BET specific surface area (Quantasorb 3 point) | 2.3 m$^2$/g |
| Oxygen content | 11000 ppm |
| Fluorine content | 120 ppm |

2$^{nd}$ Stage: First Doping with 50 ppm of Phosphorus 150 g of the material from stage 1 were wetted with 7.5 ml of an ammonium dihydrogen phosphate solution containing 1 mg of phosphorus per ml. The material was then dried at 45° C., screened to <220 μm and homogeneously mixed.

3$^{rd}$ Stage: Reducing Agglomeration 150 g of the tantalum primary powder doped with 50 ppm of P from stage 2 were mixed with 4.95 g of magnesium chips (=twice the stoichiometric quantity) and heated to 850° C. for 2 hours in a covered tantalum crucible under an argon atmosphere in a retort. After cooling, passivation was completed by allowing air to penetrate slowly.

4$^{th}$ Stage: Acid Leaching

The magnesium residues were leached out of the material with 0.6 l of acid containing 8 wt. % of H$_2$SO$_4$ and 1.8 wt. % of H$_2$O$_2$. After stirring the powder for 10 minutes in this acid, it was decanted and suction filtered and washed acid-free with demineralised water.

5$^{th}$ stage: Second Doping to Increase the P Content by 100 ppm to 150 ppm

The material, still moist from suction filtration, was wetted with 15 ml of an ammonium dihydrogen phosphate solution containing 1 mg of P/ml and dried at 45° C. The material was screened to <220 μm and homogeneously mixed. It was tested as a capacitor powder: table 1.

Example 2

(Continuation of Example 1)

100 g of the product obtained in Example 1 (sample 1) were again subjected to reducing agglomeration at 850° C. for 2 hours with twice the stoichiometric quantity of magnesium (=1.86 g of magnesium per 100 g of material).

Leaching was performed as in Example 1 with 0.22 l of acid. The material, washed free of acid, was dried at 45° C. and then screened to <220 μm and homogeneously mixed. It was tested as a capacitor powder: table 1.

Example 3

The starting material was again a tantalum primary powder produced as stated in Example 1. The most important data relating to this material are:

| | |
|---|---|
| Average grain size by Fisher Sub-Sieve Sizer (FSSS) | 0.34 μm |
| BET specific surface area (Quantasorb 3 point) | 2.35 m²/g |
| Oxygen | 7230 ppm |
| Fluorine | 740 ppm |

$1^{st}$ Stage: Chemically Activated Agglomeration 180 g of the tantalum primary powder were treated with hydrogen for 1 hour in a steel combustion boat in the steel tube at 950° C. in the same apparatus as in Example 1 and then passivated by gradual admission of air. The most important data relating to the material obtained in this way are:

| | |
|---|---|
| Oxygen content | 12000 ppm |
| Fluorine content | 181 ppm |

$2^{nd}$ Stage: First Doping with 100 ppm of Phosphorus 150 g of the material from stage 1 were wetted with 15 ml of an ammonium dihydrogen phosphate solution containing 1 mg of phosphorus per ml. The material was then dried at 45° C., screened to <220 gm and homogeneously mixed.

$3^{rd}$ Stage: Reducing Agglomeration 150 g of the tantalum primary powder doped with 100 ppm of P were mixed with 5.4 g of magnesium chips (=twice the stoichiometric quantity) and deoxidised for 2 hours at 800° C. in the same apparatus as in Example 1 and then passivated by slow admission of air.

$4^{th}$ Stage: Acid Leaching

The magnesium residues were leached out of the material with 0.65 l of acid as described in Example 1 and the material was washed acid-free.

$5^{th}$ Stage: Second Doping to Increase the Phosphorus Content from 100 ppm to 150 ppm The material, still moist from suction filtration, was wetted with 7.5 ml of an ammonium dihydrogen phosphate solution containing 1 mg of P/ml and dried at 45° C., screened to <220 μm and homogeneously mixed. FIG. 1 shows an SEM micrograph of this powder at two different magnifications. The primary particle size discernible therefrom is below 300 nm. The Mastersizer D50 value was measured as 48 μm. After 5 minutes' deagglomeration with ultrasound, this value is still 5.32 μm. It was tested as a capacitor powder: table 2.

Example 4

The starting material used was a tantalum primary powder which was the same as that used in Example 3. The subsequent washing was performed only with washing water containing hydrogen peroxide. The most important data relating to this primary powder are:

| | |
|---|---|
| Average grain size by Fisher Sub-Sieve Sizer (FSSS) | 0.35 μm |
| BET specific surface area (Quantasorb 3 point) | 2.42 m²/g |
| Oxygen | 8000 ppm |
| Fluorine | 186 ppm |

$1^{st}$ Stage: First Doping to 100 ppm of P 1 kg of the tantalum primary powder were wetted with 100 ml of an ammonium dihydrogen phosphate solution containing 1 mg of phosphorus per ml. The material was then dried at 45° C., screened to <220 μm and homogeneously mixed.

$2^{nd}$ Stage: Chemically Activated Agglomeration

The tantalum primary powder doped with 100 ppm of P was mixed with 24 g of magnesium chips and heated to 800° C. for 2 hours in a covered tantalum crucible under an argon atmosphere in a retort. After cooling, passivation was completed by allowing air to penetrate slowly.

$3^{rd}$ Stage: Acid Leaching

The magnesium residues were leached out of the material with 3 l of acid as described in Example 1, decanted, suction filtered and washed acid-free with demineralised water.

$4^{th}$ Stage: Second Doping to Increase the Phosphorus Content from 100 ppm to 150 ppm The material, still moist from suction filtration, was wetted with 50 ml of an ammonium dihydrogen phosphate solution such that the P content was increased by 50 ppm. The material was dried at 45° C., screened to <220 Am and homogeneously mixed. It was tested as a capacitor powder: table 3.

Example 5

The starting material is the tantalum primary powder used in Example 1.

$1^{st}$ Stage: Chemically Activated Agglomeration

The same method was used as described in Example 1. The composition of the resultant material was similar (1.2% O and 151 ppm F).

$2^{nd}$ Stage: First Doping with 100 ppm of Phosphorus 150 g of the material from stage 1 were wetted with 15 ml of an ammonium dihydrogen phosphate solution containing 1 mg of phosphorus per ml and dried at 45° C., screened to <220 μm and homogeneously mixed.

$3^{rd}$ Stage: Reducing Agglomeration 150 g of the material doped with 100 ppm of P from stage 2 were mixed with 5.4 g of Mg (=twice the stoichiometric quantity) and deoxidised for 2 hours in the same apparatus as in Example 1 but at 900° C. After cooling, the material was then gently passivated by slow admission of air.

$4^{th}$ Stage: Acid Leaching

The magnesium residues were leached out of the material with 0.65 l of acid as described in Example 1 and the material was washed acid-free by decanting and suction filtration with demineralised water.

$5^{th}$ Stage: Second Doping to Increase the Phosphorus Content from 100 to 150 ppm The material, still moist from suction filtration, was wetted with 7.5 ml of an ammonium dihydrogen phosphate solution containing 1 mg of P/ml and dried at 45° C. The material was screened to <220 μm and homogeneously mixed. It was tested as a capacitor powder: table 4.

TABLE 1

| | | | | | | | | | | | | | | | Anode | | Electrical test Mass of anode: 0.05 g Sintering time: 10 min Compaction density: 5.0 g/cm³ Sintering 1200° C. Forming voltage 16 V | | |
|---|---|---|---|---|---|---|---|---|---|---|---|---|---|---|---|---|---|---|---|
| Example | Fe | Cr | Ni | Na | K | Mg | F | P | C | N | O | BET m²/g | FSSS (μm) | Scott bulk density (g/inch³) | breaking strength* (kg) | Sintered density (g/cm³) | Specific capacitance (μFV/g) | Residual current (nA/μFV) |
| | ppm | | | | | | | | | | | | | | | | | |
| 1 | 19 | 5 | 13 | 4 | 17 | n.d. | 28 | 130 | 65 | 170 | 6200 | 1.84 | 0.51 | 16.4 | 3.25 | 5.1 | 100241 | 4.07 |
| 2 | 24 | 5 | 8 | 3 | 16 | 4 | 12 | 130 | 46 | 159 | 5630 | 1.63 | 0.56 | 13.0 | 3.52 | 4.9 | 95828 | 4.05 |

*at a compaction density of 5.0 g/cm³; mass of anode 0.5 g

TABLE 2

| | | | | | | | | | | Electrical test Mass of anode: 0.05 g Sintering time: 10 min Compaction density: 5.0 g/cm³ Sintering 1200° C. Forming voltage 16 V | | | Electrical test Mass of anode: 0.05 g Sintering time: 10 min Compaction density: 5.0 g/cm³ Sintering 1250° C. Forming voltage 16 V | | |
|---|---|---|---|---|---|---|---|---|---|---|---|---|---|---|---|---|
| Example | F | Mg | H | P | N | O % | density (g/inch³) | 0.50 μm BET (m²/g) | breaking strength* (kg) | Sintered density (g/cm³) | Specific capacitance (μFV/g) | Residual current (nA/μFV) | Sintered density (g/cm³) | Specific capacitance/g (μFV/g) | Residual current (nA/μFV) |
| | ppm | | | | | | | | | | | | | | |
| 3 | 39 | 7 | 240 | 130 | 207 | 0.730 | 15.5 | 2.37 | 4.45 | 4,8 | 110600 | 2.20 | 5.3 | 104850 | 2.63 |

*at a compaction density of 5.0 g/cm³; mass of anode 0.5 g

TABLE 3

| | | | | | | | | | | | Anode | Electrical test Mass of anode: 0.05 g Sintering time: 10 min Compaction density: 5.0 g/cm³ Sintering 1200° C. Forming voltage 16 V | | |
|---|---|---|---|---|---|---|---|---|---|---|---|---|---|---|
| Example | F | Mg | H | P | N | O % | Scott bulk density (g/inch³) | FSSS = 0.42 μm BET (m²/g) | breaking strength* (kg) | Sintered density (g/cm³) | Specific capacitance/g (μFV/g) | Residual current (nA/μFV) |
| | ppm | | | | | | | | | | | |
| 4 | 67 | 7 | 405 | 140 | 184 | 0.745 | 15 | 2.17 | 2.44 | 5.1 | 109150 | 2.69 |

*at a compaction density of 5.0 g/cm³; mass of anode 0.5 g

TABLE 4

| | | | | | | | | | | | | Anode | Electrical test Mass of anode: 0.05 g Sintering time: 10 min Compaction density: 5.0 g/cm³ Sintering 1200° C. Forming voltage 16 V | | | Electrical test Mass of anode: 0.05 g Sintering time: 10 min Compaction density: 5.0 g/cm³ Sintering 1200° C. Forming voltage 16 V | | |
|---|---|---|---|---|---|---|---|---|---|---|---|---|---|---|---|---|---|---|
| Example | F | Mg | H | P | C | N | O % | 0.58 μm BET (m²/g) | breaking strength* (kg) | Sintered density (g/cm³) | Specific capacitance/g (μFV/g) | Residual current (nA/μFV) | Sintered density (g/cm³) | Specific capacitance/g (μFV/g) | Residual current (nA/μFV) |
| | ppm | | | | | | | | | | | | | | |
| 5 | 33 | 6 | 145 | 120 | 48 | 252 | 0.503 | 1.48 | 3.03 | 4.78 | 91276 | 1.50 | 5.31 | 84485 | 3.01 |

*at a compaction density of 5.0 g/cm³; mass of anode 0.5 g

Example 6

A tantalum primary powder as in Example 4 was used.

1st Stage: First Doping with 100 ppm of Phosphorus

300 g of the tantalum primary powder are wetted with 30 ml of an ammonium dihydrogen phosphate solution containing 1 mg of phosphorus per ml. The material was then dried at 45° C., screened to <220 μm and homogeneously mixed.

2nd Stage: Chemically Activated Agglomeration

300 g of the primary powder doped with 100 ppm of P were mixed with 6.5 g of magnesium chips and heated to 850° C. for 2 hours in a covered tantalum crucible under an argon atmosphere in a retort. After cooling, passivation was completed by allowing air to penetrate slowly.

3rd Stage: Acid Leaching

The magnesium residues were leached out of the material with 0.8 l of acid containing 8 wt. % of $H_2SO_4$ and 1.8 wt. % of $H_2O_2$. After stirring the powder for 10 minutes in this acid, it was decanted and suction filtered and washed acid-free with demineralised water.

4th Stage: Second Doping to Increase the P Content by 50 ppm to 150 ppm

The material, still moist from suction filtration, was wetted with 15 ml of an ammonium dihydrogen phosphate solution containing 1 mg of P/ml and dried at 45° C. The material was screened to <220 μm and homogeneously mixed. It was tested as a capacitor powder: table 5.

Example 7

300 g of the material doped as in Example 4, stage 1 were mixed with twice the stoichiometric quantity of magnesium (relative to oxygen content) and 1% of $NH_4Cl$ and deoxidised and nitrided for 2 hours at 850° C.

Leaching was performed with 0.8 l of acid as in Example 6. Once washed acid-free, the material was dried at 45° C. and then screened to <220 μm and homogeneously mixed. It was tested as a capacitor powder: Table 5.

Example 8

300 g of the material doped as in Example 4, stage 1 were subjected to chemically activated agglomeration, a still higher nitrogen content being desired. To this end, the Ta powder was mixed with twice the stoichiometric quantity of magnesium and 6% of $NH_4Cl$ and heat treated for 2 hours at 850° C.

Leaching was performed with 0.8 l of acid as in Example 6. Once washed free of acid, the material was dried at 45° C. and then screened to <220 μm and homogeneously mixed. It was tested as a capacitor powder: table 5.

TABLE 5

| | | | | | | | | | | | Electrical test Compaction density 5.0 g/cm³ Mass of anode: 0.05 g Sintering time: 10 min Forming voltage 16 V | | | |
|---|---|---|---|---|---|---|---|---|---|---|---|---|---|---|
| | | | | | | | | | | | Sintering temp. 1200° C. | | Sintering temp 1250° C. | |
| Example | | Content ppm | | | | | | Grain size μm | Bulk density | Specific surface area | Specific capacitance | Residual current | Specific capacitance | Residual current |
| | Na | K | N | O | P | C | F | Mg | FSSS | g/inch³ | BET, m²/g | μFV/g | nA/μFV | μFV/g | nA/μFV |
| 6 | 3 | 20 | 177 | 6160 | 130 | 53 | 51 | 7 | 0.44 | 15.4 | 1.82 | 101373 | 1.63 | 88197 | 1.70 |
| 7 | 2 | 19 | 2750 | 5300 | 130 | 33 | 135 | 90 | 0.56 | 15.6 | 1.54 | 100944 | 0.81 | 95067 | 0.64 |
| 8 | 3 | 20 | 11100 | 5450 | 120 | 40 | 190 | 61 | 0.55 | 14.3 | 2.01 | 108347 | 1.04 | 104531 | 0.85 |

Example 9

The starting material used is a tantalum primary powder which was produced using the formulation of Example 1 by reduction of $K_2TaF_7$ and was additionally washed with a washing solution containing hydrofluoric acid and hydrogen peroxide. A dried representative sample of the resultant primary powder exhibited the following parameters:

| | |
|---|---|
| Average grain size by Fisher Sub-Sieve Sizer (FSSS) | 0.36 μm |
| BET specific surface area (Quantasorb 3-point measurement) | 2.19 m²/g |
| Bulk density | 11.2 g/inch³ |
| Oxygen | 0.658 % |
| Fluorine | 596 ppm |

1st Stage: Wet Compaction, Drying & Comminution

240 g of the still moist primary powder were combined on a porcelain dish, while being turned with a spoon and vibrated on a vibrating plate, with a quantity of water such as to impart a thixotropic consistency to the composition. In order to ensure homogeneity of this state, the dish and contents were exposed to vibration for 3 minutes. The material, which had spread out widely on the dish, was then gently dried in a circulating air drying cabinet at 45° C. The compacted and dried primary powder assumed the form of heavy, relatively strong, coarse lumps. These were carefully pressed through a 400 μm screen.

2nd Stage: Chemically Activated Agglomeration

The primary powder, compacted and granulated to <400 μm, was placed to a depth of 25 mm in a tantalum-lined steel combustion boat in a tube of temperature-resistant steel and, as described in Example 1, defluoridated with hydrogen for 1 hour at 950° C. and passivated with air.

3rd Stage: Comminution

The resultant primary powder was passed through a 400 μm screen, wherein any aggregates which had become coarser could readily be crushed to a grain size of <400 μm. The oxygen content was 1.1%.

4th Stage: Doping

180 g of the material from stage 3 having a grain size of <400 pm were obtained. This material was doped to 150 ppm of phosphorus by wetting it with 27 ml of an ammonium dihydrogen phosphate solution containing 1 mg of phosphorus per ml. The material was then dried at 45° C., screened to <400 μm and homogeneously mixed.

5$^{th}$ Stage: Reducing Agglomeration

The 180 g of the doped primary powder were mixed with 5.94 g of magnesium chips (=twice the stoichiometric quantity) and heated to 800° C. for 2 hours in a covered tantalum crucible under an argon atmosphere in a retort. After cooling, passivation was completed by allowing air to penetrate slowly.

6$^{th}$ Stage: Acid Leaching

The magnesium residues were leached out of the material with 0.7 l of acid containing 8 wt. % of $H_2SO_4$ and 1.8 wt. % of $H_2O_2$. After stirring the powder for 10 minutes in this acid, the material was decanted and suction filtered and washed acid-free with demineralised water. The material was screened to <400 μm and homogeneously mixed and tested as a capacitor powder: table 6.

FIG. 2 shows an SEM micrograph of the powder at two magnifications. The visually assessed primary grain size is approx. 200 nm. The Mastersizer D50 value is 164 μm. After 5 minutes' ultrasonication, the D50 value is still 11.3 μm.

Example 10

The starting material is again a tantalum primary powder which was produced from $K_2TaF_7$ using the formulation of Example 1. The subsequent washing was performed with water containing hydrogen peroxide only. The most important data of this primary powder were determined on a dried representative sample:

| | |
|---|---|
| Average grain size by Fisher Sub-Sieve Sizer (FSSS) | 0.36 μm |
| BET specific surface area (Quantasorb 3-point measurement) | 2.45 m²/g |
| Bulk density | 11.6 g/inch³ |
| Oxygen | 0.794 % |
| Fluorine | 215 ppm |

1$^{st}$ Stage: Wet Compaction, Drying & Comminution 350 g of the still moist primary powder were converted as in Example 9 with further water and with vibration into a composition with a thixotropic consistency. After gentle drying at 45° C., the material assumed the form of heavy, relatively strong lumps. These were simply broken up by hand to pieces of about a centimeter in size.

2$^{nd}$ Stage: Chemically Activated Agglomeration

The compacted primary powder pieces were defluoridated with hydrogen and passivated with air as in Example 9.

3$^{rd}$ Stage: Comminution

The material obtained from stage 2 was gently ground in a laboratory impact mill at a low rotational speed and with argon purging to a grain size of <400 μm. Oxygen content was determined at 1.4%.

4$^{th}$ Stage: Doping 260 g of the material obtained from stage 3 having a grain size of <400 μm were doped to 150 ppm of phosphorus by wetting it with 39 ml of an ammonium dihydrogen phosphate solution containing 1 mg of phosphorus per ml. The material was then dried at 45° C., screened to <400 μm and homogeneously mixed.

5$^{th}$ Stage: Reducing Agglomeration

The 260 g of the doped primary powder were mixed with 10.9 g of magnesium chips (=twice the stoichiometric quantity) and heated to 800° C. for 2 hours in a covered tantalum crucible under an argon atmosphere in a retort and, after cooling, passivated by gradual admission of air.

6$^{th}$ Stage: Acid Leaching

The magnesium residues were leached out of the material with 1.1 l of acid containing 8 wt. % of $H_2SO_4$ and 1.8 wt. % of $H_2O_2$. After stirring the powder for 10 minutes in this acid, the material was decanted and suction filtered and washed acid-free with demineralised water. The material was screened to <400 μm and homogeneously mixed and tested as a capacitor powder: table 6.

Example 11

1$^{st}$ Stage: Wet Compaction with Doping, Drying & Comminution 200 g of the primary powder used in Example 10 were now used in dried form and doped with 150 ppm of phosphorus by wetting the quantity of powder on a porcelain dish with 30 ml of an ammonium dihydrogen phosphate solution containing 1 mg of phosphorus per ml. Further portions of water were then added with stirring and vibration until the composition assumed a thixotropic state. The material was dried at 45° C. in the dish in which it had been worked to a paste and the resultant relatively strong lumps were broken up by hand to pieces of about a centimeter in size.

2$^{nd}$ Stage: Chemically Activated Agglomeration

The doped and comminuted primary powder pieces were treated with hydrogen as in Example 9 and passivated with air.

3$^{rd}$ Stage: Comminution

The material obtained from stage 2 was ground as in Example 9 in a laboratory impact mill to a grain size of <400 μm. The material exhibited the following data:

| | |
|---|---|
| Bulk density | 28 g/inch³ |
| BET specific surface area (Quantasorb 3-point measurement) | 2.27 m²/g |
| Oxygen | 1.3 % |
| Fluorine | 70 ppm |

4$^{th}$ Stage: Reducing Agglomeration 180 g of the material obtained from stage 3 having a grain size of <400 μm were mixed with 7.02 g of magnesium chips (=2 times the stoichiometric quantity) and deoxidised at 800° C. for 2 hours and passivated as in Example 6.

5$^{th}$ Stage: Acid Leaching

The magnesium residues were leached out of the material with 1.1 l of acid containing 8 wt. % of $H_2SO_4$ and 1.8 wt. % of $H_2O_2$ using the method described in Example 6. The material was then washed to neutrality. The material is screened to <400 μm, homogeneously mixed and tested as a capacitor powder: table 6.

TABLE 6

| | | | | | | | | Scott bulk | | Flow- | breaking | | | Residual |
| Exam- | F | Mg | H | P | C | N | O | density | BET | ability* | strength** | Sintered density | Specific capacitance | current |
| ple | | | | ppm | | | % | (g/inch$^3$) | (m$^2$/g) | (g/sec) | (kg) | (g/cm$^3$) | ($\mu$FV/g) | (nA/$\mu$FV) |
|---|---|---|---|---|---|---|---|---|---|---|---|---|---|---|
| 9 | 24 | 5 | 360 | 140 | 55 | 193 | 0.75 | 20.5 | 2.23 | 0.6 | 3.2 | 4.6 | 111795 | 1.01 |
| 10 | 29 | 5 | 479 | 140 | 55 | 157 | 0.93 | 19.8 | 2.85 | 0.53 | 2.6 | 5.3 | 120292 | 1.83 |
| 11 | 22 | 4 | 269 | 155 | 36 | 205 | 0.74 | 27.3 | 2.26 | 0.96 | 1.6 | 5.5 | 109128 | 1.78 |

Anode Electrical test — Mass of anode: 0.05 g; Sintering time: 10 min; Compaction density: 5.0 g/cm$^3$; Sintering: 1200° C.; Forming voltage: 16 V

*from a vibrating hopper having an angle of divergence of 60° and a 3.90 mm diameter outlet
**at a compaction density of 5.0 g/cm$^3$, mass of anode 0.5 g.

What is claimed is:

1. Tantalum powder product having the following characteristics:
    (a) less than 50 ppm of the total amount of sodium and potassium content and less than 200 ppm of fluorine,
    (b) particle size, determined by FSSS of 0.35 to 1 $\mu$m,
    (c) specific surface area, as determined by BET method, of 1.4 to 3 m$^2$/g,
    (d) electrical capacitance and leakage characteristics, determined by anodic oxide sintering at 1,200° C. for 10 minutes forming at 16 volts and fabrication into test capacitor units, 80,000 to 120,000 $\mu$FV/g and residual leakage current of less than 5 nA/$\mu$FV.

2. Tantalum powder product as recited in claim 1 and having nitrogen content of 30 to 15,000 ppm.

3. Tantalum agglomerate powder as recited in claim 1 with having a primary particle size determined visually from SEM micrographs of 100 to 400 nm and a secondary particle size defined by sintering of the primary particles of above 5 $\mu$m determined as a Mastersizer D50 value, and wherein the powder has a nitrogen content of 30 to 15000 ppm.

4. Tantalum powder according to one of claim 1, 2 or 3 having a phosphorus content of 50 to 500 ppm.

5. Process for the production of tantalum powders according to one of claim 1, 2 or 3 from crude tantalum powder having a primary particle size of 100 to 400 nm obtained by reduction of potassium heptafluorotantalate with sodium in an inert salt melt, characterised in that the crude tantalum powder is subjected to reducing agglomeration in the presence of hydrogen at a temperature of 600 to 950° C.

6. Process according to claim 5, characterised in that the hydrogen is provided as a hydrogen atmosphere or in the form of hydrogen-releasing compounds.

7. Process according to claim 5, characterised in that the tantalum powder is combined in one or more stages, preferably in two stages, with phosphorus or phosphorus compounds and is then subjected to deoxidising treatment at temperatures of 800 to 870° C. in the presence of magnesium chips.

8. Process according to either of claim 6 or 7 wherein, before the reducing agglomeration, the crude tantalum powder is subjected to wet compaction by being suspended in water or a phosphorus salt solution and is dried.

9. Tantalum anode for capacitors produced from tantalum powder according to any of claim 1, 2 or 3.

10. Capacitors containing tantalum anodes according to claim 9.

11. Process according to claim 7 wherein, before the reducing agglomeration, the crude tantalum powder is subjected to wet compaction by being suspended in water or a phosphorus salt solution and is dried.

* * * * *